United States Patent [19]

Suzuki

[11] Patent Number: 5,270,860
[45] Date of Patent: Dec. 14, 1993

[54] OBJECTIVE FOR MICROSCOPES

[75] Inventor: Toshinobu Suzuki, Tokyo, Japan

[73] Assignee: Olympus Optical Co., Ltd., Tokyo, Japan

[21] Appl. No.: 967,843

[22] Filed: Oct. 28, 1992

[30] Foreign Application Priority Data

Oct. 28, 1991 [JP] Japan .................. 3-281222

[51] Int. Cl.$^5$ .................. G02B 21/02; G02B 9/34
[52] U.S. Cl. .................. 359/660; 359/656; 359/772
[58] Field of Search .............. 359/656, 657, 658, 659, 359/660, 771, 772, 773, 774, 780

[56] References Cited

U.S. PATENT DOCUMENTS

| | | | |
|---|---|---|---|
| 4,280,757 | 7/1981 | Tojo | 359/660 |
| 4,505,553 | 3/1985 | Asoma | 359/658 |
| 4,953,962 | 9/1990 | Esswein et al. | 359/660 |

FOREIGN PATENT DOCUMENTS

| | | | |
|---|---|---|---|
| 57-148717 | 9/1982 | Japan . | |
| 59-100409 | 6/1984 | Japan . | |
| 100409 | 6/1984 | Japan | 359/660 |
| 247613 | 12/1985 | Japan | 359/660 |
| 61-275812 | 12/1986 | Japan . | |

OTHER PUBLICATIONS

English abstract of JP 57-148717, Sep. 1982.
English abstract of JP 59-100409, Jun. 1984.
English abstract of JP 61-275812, Dec. 1986.

*Primary Examiner*—Bruce Y. Arnold
*Assistant Examiner*—David R. Parsons
*Attorney, Agent, or Firm*—Cushman, Darby & Cushman

[57] ABSTRACT

The invention relates to an objective-with-a-corrector-ring for microscopes that is of about 40 magnifications and has an NA of 0.93 with well-corrected aberrations over an ultra-wide field range, and is less likely to degrade in performance due to a thickness variation of the cover glass. This objective comprises a first lens group G1 that includes a positive meniscus lens concave on the object side and has positive refracting power as a whole, a second lens group G2 that is movable along the optical axis and has small refracting power, a third lens group G3 that is of positive refracting power and converts an exit luminous flux leaving the object and passing through said first and second lens groups to a converging flux, and a fourth lens group G4 that includes two lens surfaces opposite on the concave surfaces to each other through an air separation. The second lens group is movable relative to the first and third lens groups depending on a thickness change of the cover glass.

8 Claims, 11 Drawing Sheets

OBJECTIVE FOR MICROSCOPES

BACKGROUND OF THE INVENTION

The present invention relates to an objective for microscopes and, more specifically, to a so-called objective-with-a-corrector-ring that is capable of compensating for aberrational variations which occur when there is a change in the thickness of a cover glass.

When microscopic samples are generally prepared in the biological field, most of them are a so-called sample with a cover glass, in which a specimen is placed on a slide glass and the cover glass is then applied thereon for sealing purposes. The thickness and refractive index of this cover glass are provided by JIS (the Japanese Industrial Standards) and, usually, the reference thickness for design is 0.17 mm. When the thickness of the cover glass departs from the reference value, there is a degradation of the capability of forming images. As the numerical aperture (NA) increases, the influence of such thickness errors increases, correspondingly. With an NA exceeding 0.8, it is required to make use of a so-called corrector ring to set off aberrational variations. With an NA exceeding 0.9, such variations are so large that any objective can no longer be used without a corrector ring mechanism. In particular, there is a great demand for lenses that are not only of high contrast and high resolving power but can also form images with well-enough flatness even in an ultra-wide field so as to improve the efficiencies of photography and microscopic analysis.

Japanese Provisional Patent Publication No. 57-148717 sets forth one typical objective with a corrector ring, which is of 40 magnifications, has an NA of 0.55 and includes a cover glass of 0 to 2 mm in thickness. According to this publication, the objective comprises, in order from the object side, a first lens group of positive refracting power, a second lens group of positive refracting power and a third lens group of positive refracting power and aberrations due to a thickness change of the cover glass are corrected by moving only the second lens group along the optical axis.

Another typical example that is of 60 magnifications, has an NA of 0.7 and uses a cover glass of 0.7 to 1.7 mm in thickness is disclosed in Japanese Provisional Patent Publication No. 59-100409. This objective comprises, in order from the object side, a first lens group that has positive refracting power and converts luminous flux from the object to a converging flux, a second lens group that is movable along the optical axis in said converging flux and has small refracting power and a third lens group of negative refracting power, and aberrations due to a thickness change of the cover glass are corrected by moving only the second lens group along the optical axis.

A further typical example that is of 40 magnifications, has an NA of 0.95 and uses a cover glass of 0.11 to 0.23 mm in thickness is referred to in Japanese Provisional Patent Publication No. 61-275812. This objective comprises, in order from the object side, a first lens group that has positive refracting power and converts luminous flux to a converging flux, a second lens group that uses a cemented lens component including a diverging cemented surface and a cemented lens component including a converging cemented surface and has a composite positive refracting power, and a third lens group that includes a cemented surface and is of negative refracting power, and aberrations due to a thickness change of the cover glass are corrected by moving the second and third lens groups relative to the first lens group.

The technique of Japanese Provisional Patent Publication No. 57-148717, because of having an NA of 0.55, cannot stand comparison with an objective having an NA of 0.93, to which the invention is directed. Under an NA condition of 0.55, the desired goal is somehow achieved, if there are some certain chromatic aberration, curvature of field and coma. However, as the NA increases to 0.93, the allowable amounts of aberrations decrease, because the focal depth decreases, correspondingly. It is a matter of course that with this technique it is impossible to increase the NA.

The technique of Japanese Provisional Patent Publication No. 59-100409 achieves an NA of 0.7, but chromatic aberration and off-axial aberrations are quite insufficient at an NA as high as 0.93.

Japanese Provisional Patent Publication No. 61-275812 mentioned above refers to an objective having an NA increased to 0.95. A problem with this technique is that the correction of coma is not well-enough at an image height expressed by $y=9$ or more and coma degrades due to a thickness variation of the cover glass.

SUMMARY OF THE INVENTION

In view of such situations as mentioned above, an object of the invention is to provide an objective with a corrector ring for microscopes, which is of about 40 magnifications and an NA as large as 0.93 with well-corrected aberrations (such as spherical aberration, chromatic aberration and coma) over an ultra-wide field range, and is further less likely to degrade in terms of performance due to a thickness variation of the cover glass.

According to one aspect of the invention, the goal mentioned above is achieved by the provision of an objective for microscopes that has an NA of 0.8 or more, which comprises, in order from the object side, a first lens group that includes a positive meniscus lens concave on the object side and has positive refracting power as a whole, a second lens group that is located through an air separation with respect to said first lens group, a third lens group that is of positive refracting power and converts an exit luminous flux leaving the object and passing through said first and second lens groups to a converging flux, and a fourth lens group that is located through an air separation with respect to said third lens group and includes at least a front lens element concave on the image side and a rear lens element concave on the object side through air, and in which when a parallel, plane sheet such as a cover glass is interposed between the object and said first lens group, said second lens group is designed to be movable on the optical axis so as to correct aberrational variations occurring incidental to a thickness change of said parallel, plane sheet.

According to another aspect of the invention, there is provided an objective for microscopes, which comprises, in order from the object side, a first lens group that includes a positive meniscus lens component concave on the object side and has positive refracting power as a whole, a second lens group that conforms to the following condition (1) and has small refracting power, a third lens group that has positive refracting power and reflexes an exit luminous flux leaving the object and passing through said first and second lens groups in the optical axis direction, and a fourth lens group that includes two opposite concave surfaces with air between them, and in which when a parallel, plane sheet such as a cover glass is interposed between the object and said first lens group, said second lens group is designed to be movable on the optical axis so as to correct aberrational variations occurring incidental to a thickness change of said parallel, plane sheet:

$$|f_2/F| > 50 \tag{1}$$

where F is the composite focal length of the total system and $f_2$ is the focal length of said second lens group.

In what follows, why the arrangement mentioned above is adopted and how it works will be explained at great length.

In order to secure the flatness of an image surface over an ultra-wide field range, two lens surfaces that are opposite on the concave surfaces to each other with an air spacing between them are first incorporated in the fourth lens group. The Petzval's sum is corrected by the converging action of both the concave surfaces. In order to correct off-axial aberrations well through the fourth lens group and compensate for spherical aberration with respect to an increased NA, the third lens group is then designed such that the height of an axial marginal ray is maximized at the third lens group. This is done to prevent the refracting power of the convex surface of the fourth lens group proximate to the object side from becoming larger than required, when the fourth lens group is incorporated in the converging flux. As the refracting power of the convex surface is larger than required, large negative spherical aberration occurs, partly because the NA is high, so that the refracting power of the convex surface and the refracting powers of the two concave surfaces in the fourth lens group are off balance.

Then, in order to well correct spherical aberration occurring due to a thickness variation of the cover glass and to prevent the degradation of the good off-axial performance of the third and fourth lens groups, the second lens group alone is designed to be movable in the optical axis direction. In the case of an objective with a corrector ring, which lens group is moved is achieved in various ways. In the present invention, however, the movement of the fourth lens group leads to large performance degradation, because the lens surfaces thereof are designed to have large refracting powers. The height of light is so maximized at the third lens group that it cannot be moved, because there is large performance degradation. In order to reduce performance degradation to the minimum, therefore, there is no choice but to rely upon the movement of the second lens group. In the rear of the second lens group, there is arranged the third lens group for converging exit luminous flux leaving the object and passing through the first and second lens group (that is here in the form of a diverging flux) to a converging flux, which is then allowed to be incident on the fourth lens group. In addition, it is required that the refractive power of the second lens group be small. This is because of a high NA or, with an increase in that refracting power, a thickness variation of the cover glass gives rise to spherical aberration too large to compensate for. It is thus desired that the refracting power of the second lens group conform to the following condition (1):

$$|f_2/F| > 50 \tag{1}$$

where $f_2$ is the composite focal length of the total system and F is the focal length of the second lens group. If $|f_2/F| < 50$, then the refracting power of the second lens group becomes too large to compensate for spherical aberration due to a thickness variation of the cover glass.

In the present invention, the following arrangements are envisages as preferable embodiments.

First, the first lens group is desired to be a cemented lens component. This is because, since this lens group is a moving one, of importance for it is that it is subject to color correction by itself.

Second, the third lens group is desired to comprise three or more lens components, because it serves to convert the exit luminous flux leaving the object and passing through the first and second lens groups to a converging flux and the height of light is maximized there. Because of a high NA as well, it is important for correcting aberrations that the light is gradually reflexed.

Third, the fourth lens group be desired to comprise three lens components, say, a cemented doublet in a meniscus form convex on the object side, a negative lens in a meniscus form concave on the object side and a positive lens concave on the object side. If the following condition (2):

$$r_{45}/r_{46} > 1.5 \tag{2}$$

where $r_{45}$ and $r_{46}$ are the radii of curvature of the image-side surface of the above-mentioned negative meniscus lens concave on the object side and the above-mentioned positive meniscus lens concave on the object side, is satisfied, then it is possible to correct coma even more satisfactorily. Conversely speaking, some departure from this condition (2) makes coma worse.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
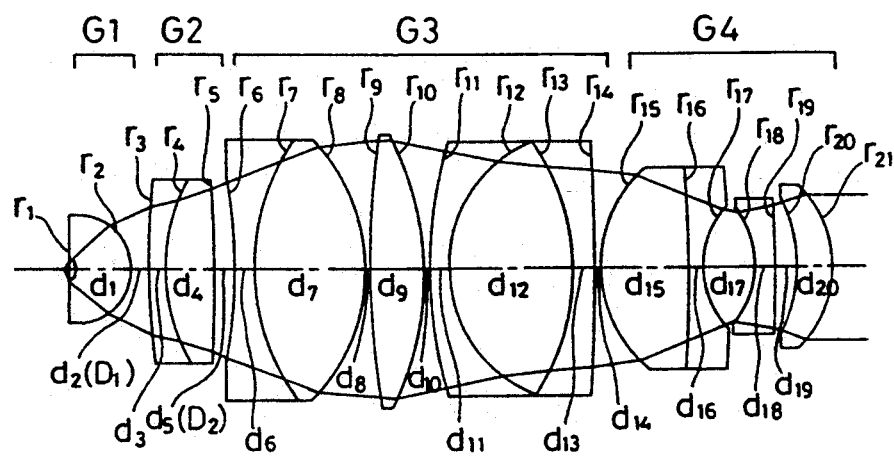
FIG. 1 represents in section a lens arrangement of Example 1 of the objective for microscopes according to the invention.
Figure 2:
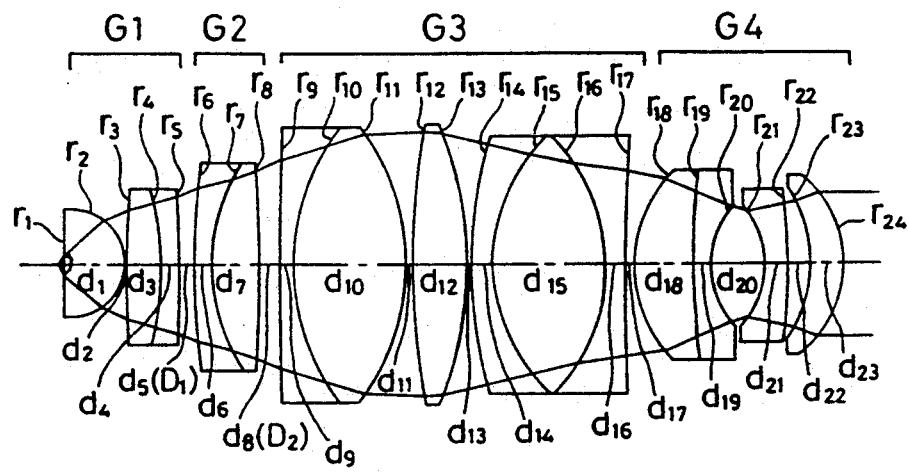
FIG. 2 represents in section a lens arrangement of Example 2 of the invention.
Figure 3:
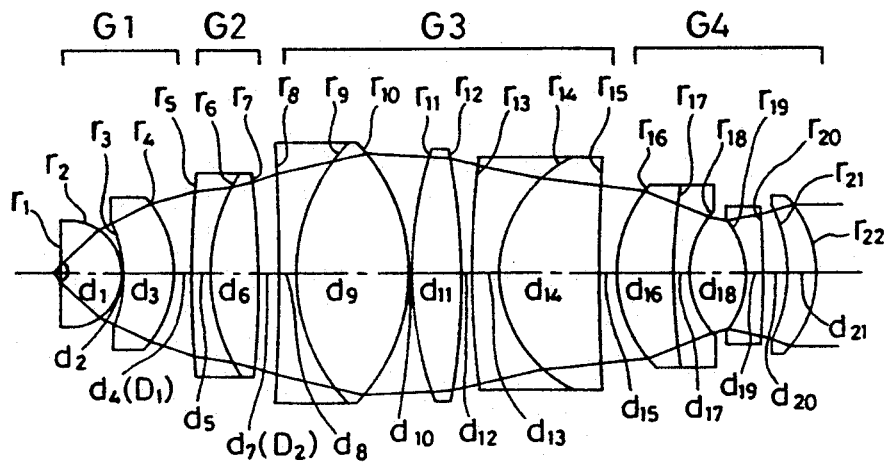
FIG. 3 represents in section a lens arrangement of Example 3 of the invention.

In the following description, the objective for microscopes of the invention will be explained with reference to Examples 1-3. The lens arrangements of Examples 1-3 are shown in section in FIGS. 1-3, respectively.

In Example 1, the first lens group G1 consists of one positive meniscus lens concave on the object side; the second lens group G2 consists of one cemented lens of a negative meniscus lens convex on the object side with a double-convex lens; the third lens group G3 consists of three lens components, say, a cemented lens of a double-concave lens with a double-convex lens, a double-convex lens and a cemented lens consisting of a negative meniscus lens convex on the object side, a double-convex lens and a negative meniscus lens convex on the image side; and the fourth lens group G4 consists of three lens components, say, a cemented meniscus lens of a double-convex lens with a double-concave lens, a negative meniscus lens concave on the object side and a positive meniscus lens concave on the object side.

In Example 2, the first lens group G1 consists of two lens components, say, a positive meniscus lens concave on the object side and a cemented lens of a double-convex lens with a negative meniscus lens concave on the object side; the second lens group G2 consists of one cemented lens of a negative meniscus lens convex on the object side with a double-convex lens; the third lens group G3 consists of three lens components, say, a cemented lens of a negative meniscus lens convex on the object side with a double-convex lens, a double-convex lens and a cemented lens consisting of a negative meniscus lens convex on the object side, a double-convex lens and a double-concave lens; and the fourth lens group G4 consists of three lens components, say, a cemented meniscus lens of a positive meniscus lens convex on the object side with a negative meniscus lens convex on the object side, a negative meniscus lens concave on the object side and a positive meniscus lens concave on the object side.

In Example 3, the first lens group G1 consists of two lens components, say, a negative meniscus lens concave on the object side and a positive meniscus lens concave on the object side; the second lens group G2 consists of one cemented lens of a negative meniscus lens convex on the object side with a double-convex lens; the third lens group G3 consists of three lens components, say, a cemented lens of a double-concave lens with a double-convex lens, a double-convex lens and a cemented lens of a negative meniscus lens convex on the object side with a positive meniscus lens convex on the object side; and the fourth lens group G4 consists of three lens components, say, a cemented meniscus lens of a positive meniscus lens convex on the object side with a negative meniscus lens convex on the object side, a negative meniscus lens concave on the object side and a positive meniscus lens concave on the object side.

Set out below are the lens data of each example with the symbols having the following meanings:

$\beta$ . . . the magnifications.

NA . . . the numerical aperture.

F . . . composite focal length of the total system.

$f_2$ . . . the focal length of the second lens group G2.

$r_{45}$ . . . the radius of curvature of the image-side surface of the negative meniscus lens of the fourth lens group G4 that is concave on the object side.

$r_{46}$ . . . the radius of curvature of the object-side surface of the positive meniscus lens of the fourth lens group G4 that is concave on the object side.

t . . . the thickness of the cover glass.

$d_0$ . . . the distance, calculated as air, from the rear surface of the cover glass to the first lens surface of the first lens group G1.

$D_1$ . . . the spacing between the first and second lens groups G1 and G2.

$D_2$ . . . the spacing between the second and third lens groups G2 and G3.

$r_1, r_2$ . . . the radii of curvature of the lenses shown in order from the object side.

$d_1, d_2$ . . . the spacings between the lens surfaces shown in order from the object side.

$n_{d1}, n_{d2}$ . . . the d-line refractive indices of the lenses shown in order from the object side.

$v_{d1}, v_{d2}$ . . . the Abbe's numbers of the lenses shown in order from the object side.

EXAMPLE 1

$\beta = 40X$, NA = 0.93, F = 4.5, $f_2 = -1097$,
$r_{45} = -38.7016$, $r_{46} = -8.1822$,
$|f_2/F| = 244$, $r_{45}/r_{46} = 4.7$

| | | | |
|---|---|---|---|
| $r_1 = -3.4694$ | $d_1 = 3.8173$ | $n_{d1} = 1.78650$ | $v_{d1} = 50.00$ |
| $r_2 = -3.1015$ | $d_2 = D_1$ | | |
| $r_3 = 55.8093$ | $d_3 = 1.0000$ | $n_{d2} = 1.61340$ | $v_{d2} = 43.84$ |
| $r_4 = 9.9170$ | $d_4 = 3.0000$ | $n_{d3} = 1.43875$ | $v_{d3} = 94.97$ |
| $r_5 = -79.0395$ | $d_5 = D_2$ | | |
| $r_6 = -31.9094$ | $d_6 = 1.2000$ | $n_{d4} = 1.61340$ | $v_{d4} = 43.84$ |
| $r_7 = 12.1967$ | $d_7 = 6.9000$ | $n_{d5} = 1.56907$ | $v_{d5} = 71.30$ |
| $r_8 = -10.1918$ | $d_8 = 0.2000$ | | |
| $r_9 = 49.1000$ | $d_9 = 3.3000$ | $n_{d6} = 1.43875$ | $v_{d6} = 94.97$ |
| $r_{10} = -17.3464$ | $d_{10} = 0.2000$ | | |
| $r_{11} = 30.1059$ | $d_{11} = 1.2000$ | $n_{d7} = 1.61340$ | $v_{d7} = 43.84$ |
| $r_{12} = 8.1664$ | $d_{12} = 7.6000$ | $n_{d8} = 1.43875$ | $v_{d8} = 94.97$ |
| $r_{13} = -11.8836$ | $d_{13} = 1.2000$ | $n_{d9} = 1.52130$ | $v_{d9} = 52.55$ |
| $r_{14} = -136.8173$ | $d_{14} = 0.3000$ | | |
| $r_{15} = 7.7580$ | $d_{15} = 5.2000$ | $n_{d10} = 1.56907$ | $v_{d10} = 71.30$ |
| $r_{16} = -208.4228$ | $d_{16} = 1.0000$ | $n_{d11} = 1.50847$ | $v_{d11} = 60.83$ |
| $r_{17} = 5.1093$ | $d_{17} = 3.1711$ | | |
| $r_{18} = -4.8421$ | $d_{18} = 1.2000$ | $n_{d12} = 1.61340$ | $v_{d12} = 43.84$ |
| $r_{19} = -38.7016$ | $d_{19} = 1.3000$ | | |
| $r_{20} = -8.1822$ | $d_{20} = 2.1000$ | $n_{d13} = 1.80518$ | $v_{d13} = 25.43$ |
| $r_{21} = -6.4048$ | | | |
| t | 0.17 | 0.11 | 0.23 |
| $d_0$ | 0.21 | 0.25 | 0.17 |
| $D_1$ | 1.105 | 1.679 | 0.380 |
| $D_2$ | 1.132 | 0.558 | 1.857 |

EXAMPLE 2

$\beta = 40X$, NA = 0.93, F = 4.5, $f_2 = -935$,
$r_{45} = -25.3511$, $r_{46} = -7.4999$,
$|f_2/F| = 208$, $r_{45}/r_{46} = 3.38$

| | | | |
|---|---|---|---|
| $r_1 = -3.1143$ | $d_1 = 3.7913$ | $n_{d1} = 1.78650$ | $v_{d1} = 50.00$ |
| $r_2 = -2.9979$ | $d_2 = 0.1000$ | | |
| $r_3 = 322.6537$ | $d_3 = 2.2000$ | $n_{d2} = 1.43875$ | $v_{d2} = 94.97$ |
| $r_4 = -11.8475$ | $d_4 = 1.0000$ | $n_{d3} = 1.61659$ | $v_{d3} = 36.63$ |
| $r_5 = -62.2689$ | $d_5 = D_1$ | | |
| $r_6 = 70.1918$ | $d_6 = 1.0000$ | $n_{d4} = 1.61340$ | $v_{d4} = 43.84$ |
| $r_7 = 10.8819$ | $d_7 = 3.0000$ | $n_{d5} = 1.43875$ | $v_{d5} = 94.97$ |
| $r_8 = -71.9786$ | $d_8 = D_2$ | | |

-continued

| | | | |
|---|---|---|---|
| $r_9 = 182.5902$ | $d_9 = 1.0000$ | $n_{d6} = 1.61340$ | $v_{d6} = 43.84$ |
| $r_{10} = 12.8471$ | $d_{10} = 6.9000$ | $n_{d7} = 1.56907$ | $v_{d7} = 71.30$ |
| $r_{11} = -12.2118$ | $d_{11} = 0.2000$ | | |
| $r_{12} = 45.2966$ | $d_{12} = 3.3000$ | $n_{d8} = 1.43875$ | $v_{d8} = 94.97$ |
| $r_{13} = -20.8386$ | $d_{13} = 0.2000$ | | |
| $r_{14} = 24.9630$ | $d_{14} = 1.2000$ | $n_{d9} = 1.61340$ | $v_{d9} = 43.84$ |
| $r_{15} = 9.8594$ | $d_{15} = 6.9500$ | $n_{d10} = 1.43875$ | $v_{d10} = 94.97$ |
| $r_{16} = -11.2928$ | $d_{16} = 1.2000$ | $n_{d11} = 1.52130$ | $v_{d11} = 52.55$ |
| $r_{17} = 155.5193$ | $d_{17} = 0.3000$ | | |
| $r_{18} = 7.5255$ | $d_{18} = 3.6071$ | $n_{d12} = 1.56907$ | $v_{d12} = 71.30$ |
| $r_{19} = 74.9219$ | $d_{19} = 1.0000$ | $n_{d13} = 1.50847$ | $v_{d13} = 60.83$ |
| $r_{20} = 5.0966$ | $d_{20} = 3.5000$ | | |
| $r_{21} = -4.5931$ | $d_{21} = 1.2000$ | $n_{d14} = 1.61340$ | $v_{d14} = 43.84$ |
| $r_{22} = -25.3511$ | $d_{22} = 1.3000$ | | |
| $r_{23} = -7.4999$ | $d_{23} = 2.1000$ | $n_{d15} = 1.80518$ | $v_{d15} = 25.43$ |
| $r_{24} = -6.2181$ | | | |
| t | 0.17 | 0.11 | 0.23 |
| $d_0$ | 0.21 | 0.25 | 0.17 |
| $D_1$ | 0.886 | 1.325 | 0.380 |
| $D_2$ | 1.039 | 0.600 | 1.545 |

EXAMPLE 3

$\beta = 40X$, NA = 0.93, F = 4.5, $f_2 = -768$,
$r_{45} = -23.1619$, $r_{46} = -8.2765$,
$|f_2/F| = 171$, $r_{45}/r_{46} = 2.8$

| | | | |
|---|---|---|---|
| $r_1 = -3.1783$ | $d_1 = 3.7227$ | $n_{d1} = 1.78650$ | $v_{d1} = 50.00$ |
| $r_2 = -3.1829$ | $d_2 = 0.1000$ | | |
| $r_3 = -7.9435$ | $d_3 = 3.1370$ | $n_{d2} = 1.43875$ | $v_{d2} = 94.97$ |
| $r_4 = -5.8522$ | $d_4 = D_1$ | | |
| $r_5 = 98.8415$ | $d_5 = 1.0000$ | $n_{d3} = 1.61340$ | $v_{d3} = 43.84$ |
| $r_6 = 10.5764$ | $d_6 = 2.9981$ | $n_{d4} = 1.43875$ | $v_{d4} = 94.97$ |
| $r_7 = -49.8757$ | $d_7 = D_2$ | | |
| $r_8 = -168.8209$ | $d_8 = 1.2000$ | $n_{d5} = 1.61340$ | $v_{d5} = 43.84$ |
| $r_9 = 11.4264$ | $d_9 = 6.8000$ | $n_{d6} = 1.56907$ | $v_{d6} = 71.30$ |
| $r_{10} = -11.4265$ | $d_{10} = 0.2000$ | | |
| $r_{11} = 24.1628$ | $d_{11} = 3.1000$ | $n_{d7} = 1.43875$ | $v_{d7} = 94.97$ |
| $r_{12} = -37.7999$ | $d_{12} = 0.5000$ | | |
| $r_{13} = 82.2557$ | $d_{13} = 1.5000$ | $n_{d8} = 1.61340$ | $v_{d8} = 43.84$ |
| $r_{14} = 7.3857$ | $d_{14} = 6.4000$ | $n_{d9} = 1.43875$ | $v_{d9} = 94.97$ |
| $r_{15} = 282.6304$ | $d_{15} = 0.6000$ | | |
| $r_{16} = 7.0532$ | $d_{16} = 3.5900$ | $n_{d10} = 1.56907$ | $v_{d10} = 71.30$ |
| $r_{17} = 35.9009$ | $d_{17} = 1.0000$ | $n_{d11} = 1.51633$ | $v_{d11} = 64.15$ |
| $r_{18} = 4.9808$ | $d_{18} = 3.5000$ | | |
| $r_{19} = -4.7875$ | $d_{19} = 1.0000$ | $n_{d12} = 1.61340$ | $v_{d12} = 43.84$ |
| $r_{20} = -23.1619$ | $d_{20} = 1.3000$ | | |
| $r_{21} = -8.2765$ | $d_{21} = 1.8500$ | $n_{d13} = 1.80518$ | $v_{d13} = 25.43$ |
| $r_{22} = -6.3565$ | | | |
| t | 0.17 | 0.11 | 0.23 |
| $d_0$ | 0.26 | 0.3 | 0.22 |
| $D_1$ | 1.080 | 1.649 | 0.420 |
| $D_2$ | 1.169 | 0.600 | 1.829 |

Figure 13:
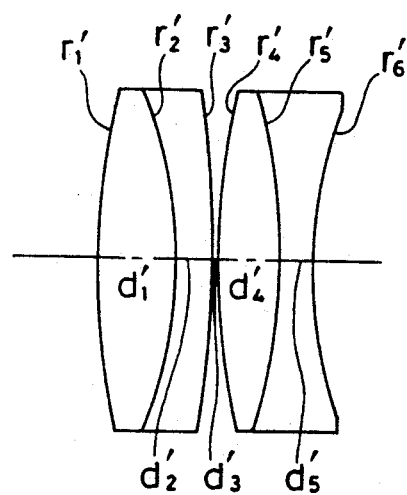
FIG. 13 represents in section a lens arrangement of the image-forming lens used in combination with the objectives of Examples 1-3.

The objectives of Examples 1-3, for instance, have the following lens data, and are used in combination with the image-forming lens shown in section in FIG. 13. It is noted that symbols have the following means:

$r_1'$, $r_2'$ . . . the radii of curvature of the lenses shown in order from the object side.

$d_1'$, $d_2'$ . . . the spacings between the lens surface shown in order from the object side.

$n_{d1}'$, $n_{d2}'$ . . . the d-line refractive indices of the lenses in order from the object side.

$v_{d1}'$, $v_{d2}'$ . . . the Abbe's number of the lenses shown in order from the object side.

| | | | |
|---|---|---|---|
| $r_1' = 68.7541$ | $d_1' = 7.7321$ | $n_{d1}' = 1.48749$ | $v_{d1}' = 70.20$ |
| $r_2' = -37.5679$ | $d_2' = 3.4742$ | $n_{d2}' = 1.80610$ | $v_{d2}' = 40.95$ |
| $r_3' = -102.8477$ | $d_3' = 0.6973$ | | |
| $r_4' = 84.3099$ | $d_4' = 6.0238$ | $n_{d3}' = 1.83400$ | $v_{d3}' = 37.16$ |
| $r_5' = -50.7100$ | $d_5' = 3.0298$ | $n_{d4}' = 1.64450$ | $v_{d4}' = 40.82$ |
| $r_6' = 40.6619$ | | | |

Figure 4:
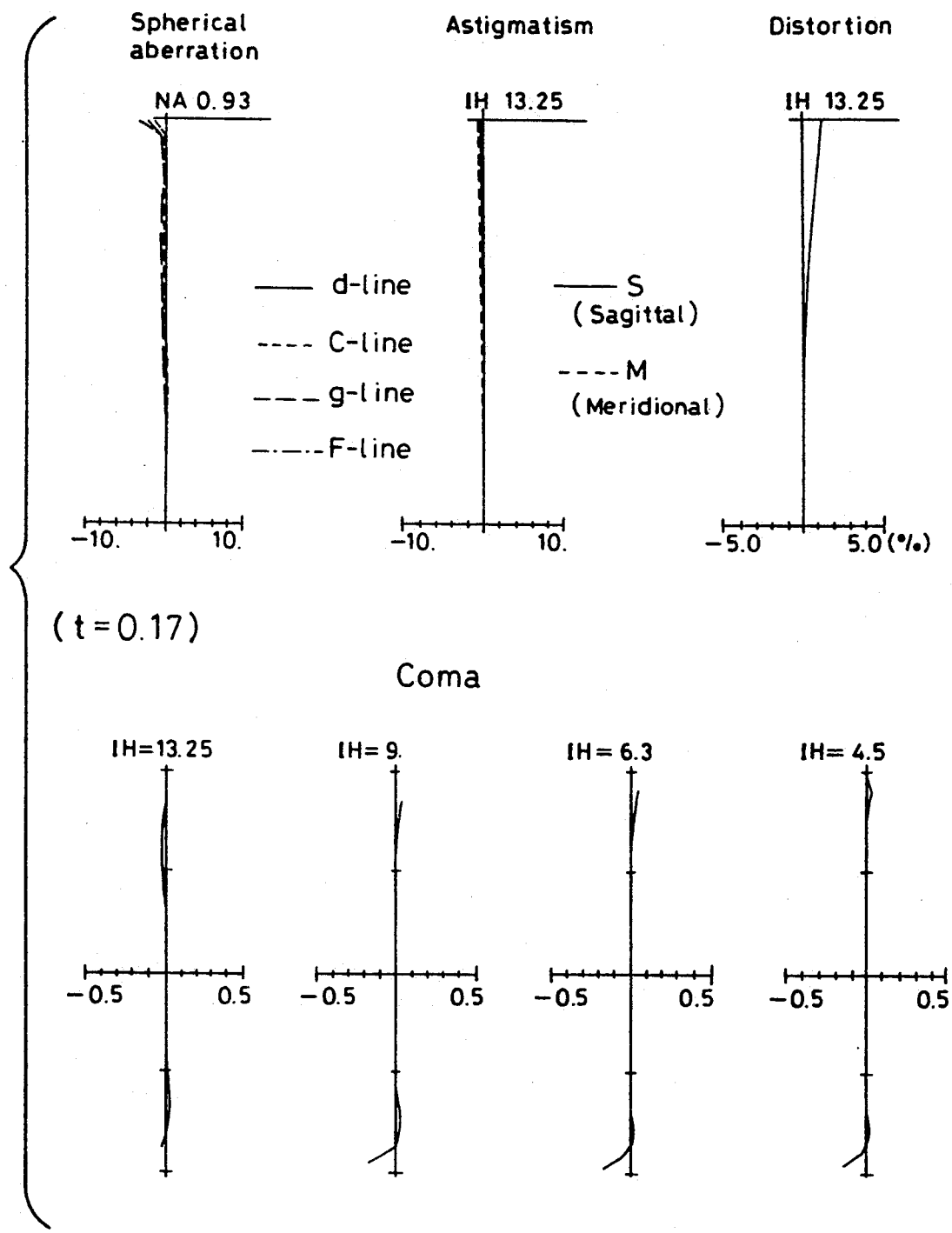
FIG. 4 represents aberration diagrams showing spherical aberration, astigmatism, distortion and coma, when the thickness of the cover glass of Example 1 is expressed in terms of t=0.17.
Figure 5:
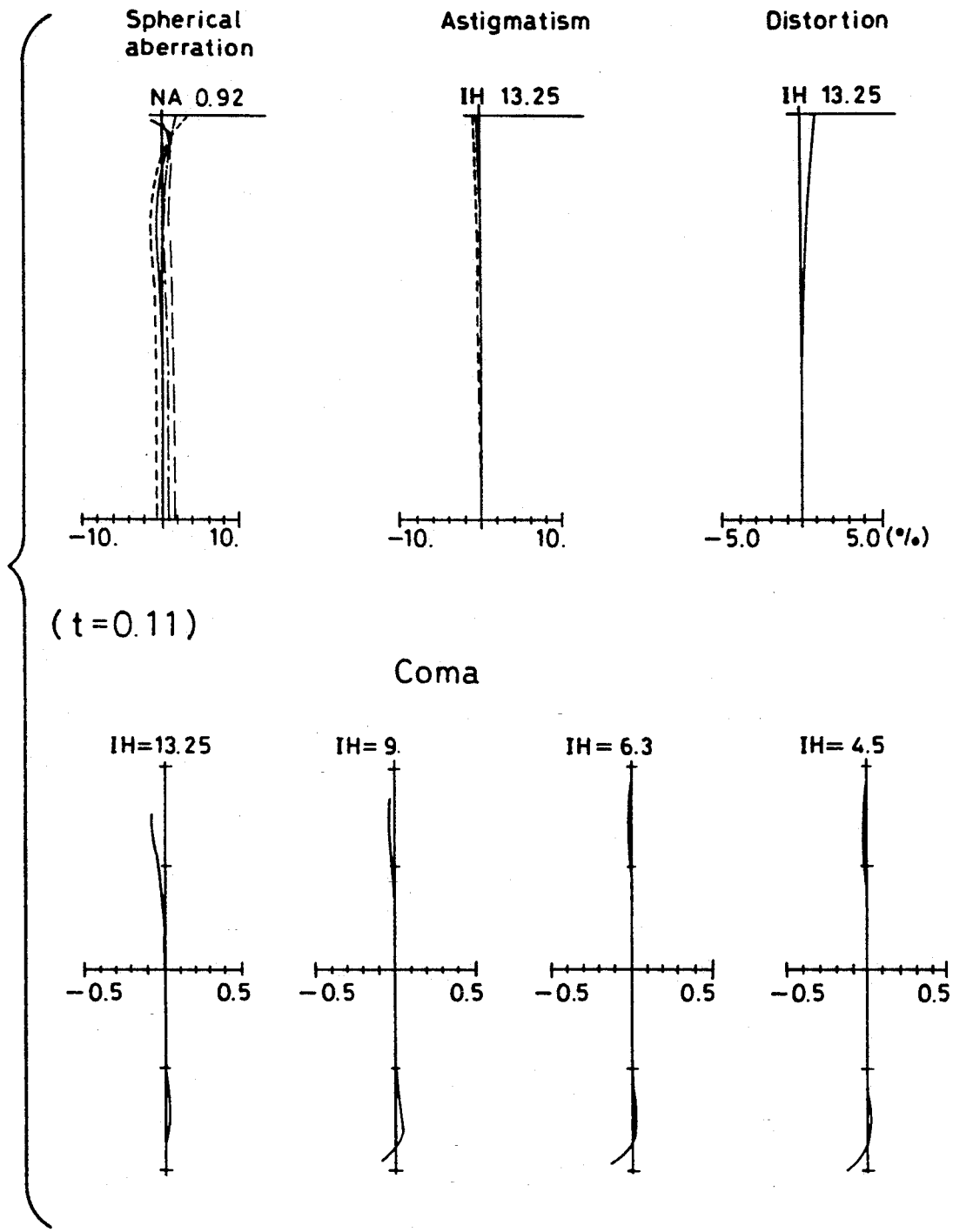
FIG. 5 represents aberration diagrams similar to those of FIG. 4, when t=0.11 in Ex. 1.
Figure 6:
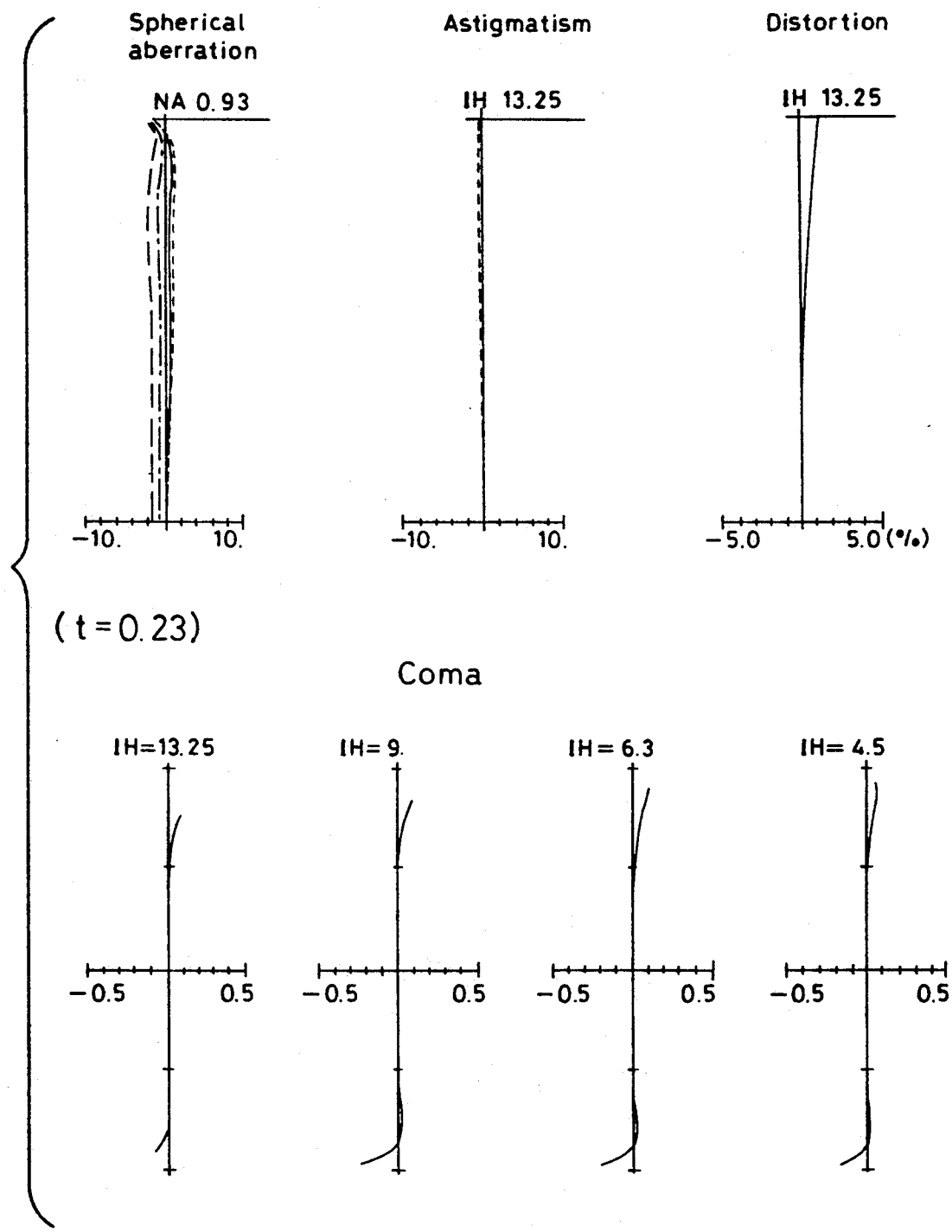
FIG. 6 represents aberration diagrams similar to those of FIG. 4, when t=0.23 in Ex. 1.
Figure 7:
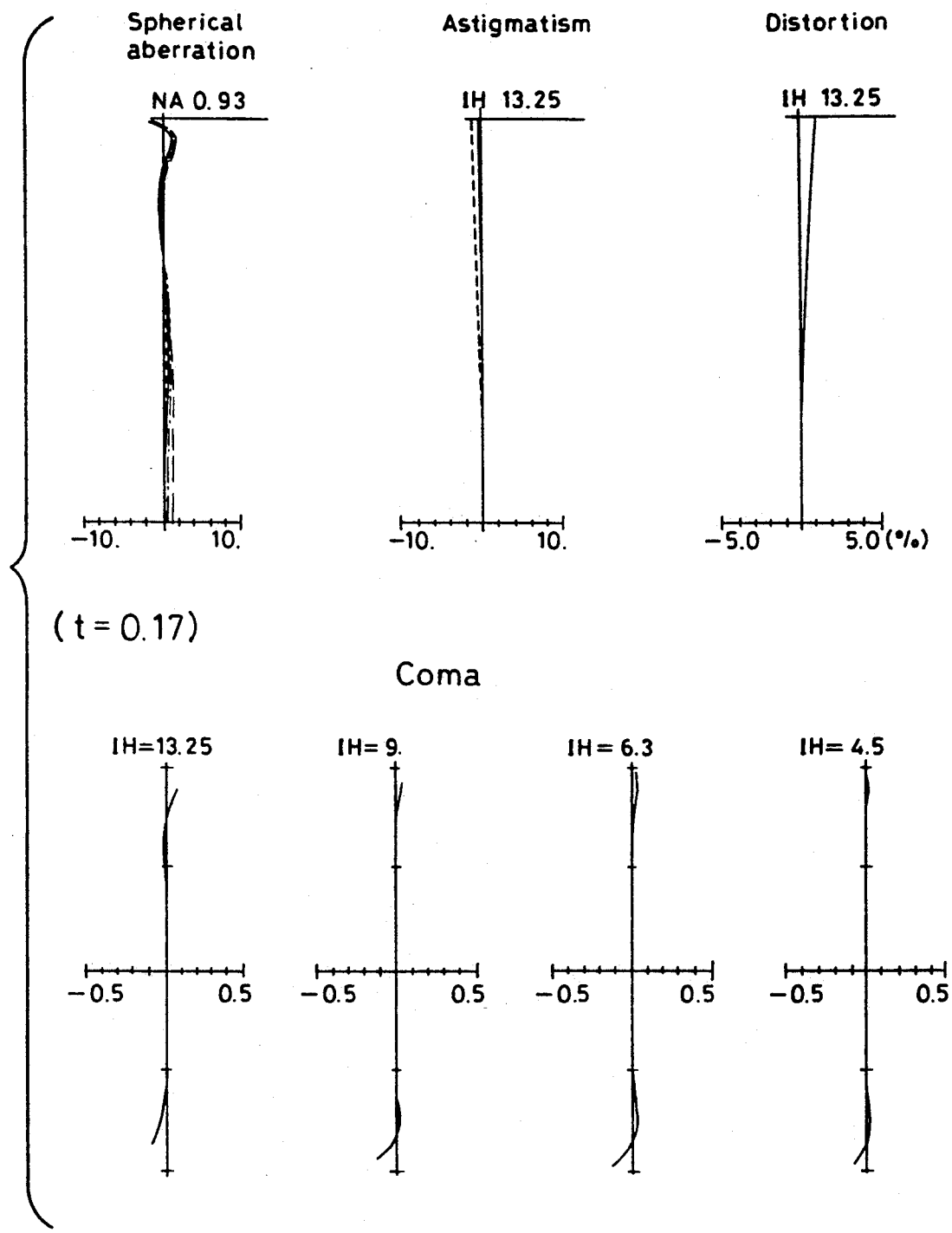
FIG. 7 represents aberration diagrams similar to those of FIG. 4, when t=0.17 in Ex. 2.
Figure 8:
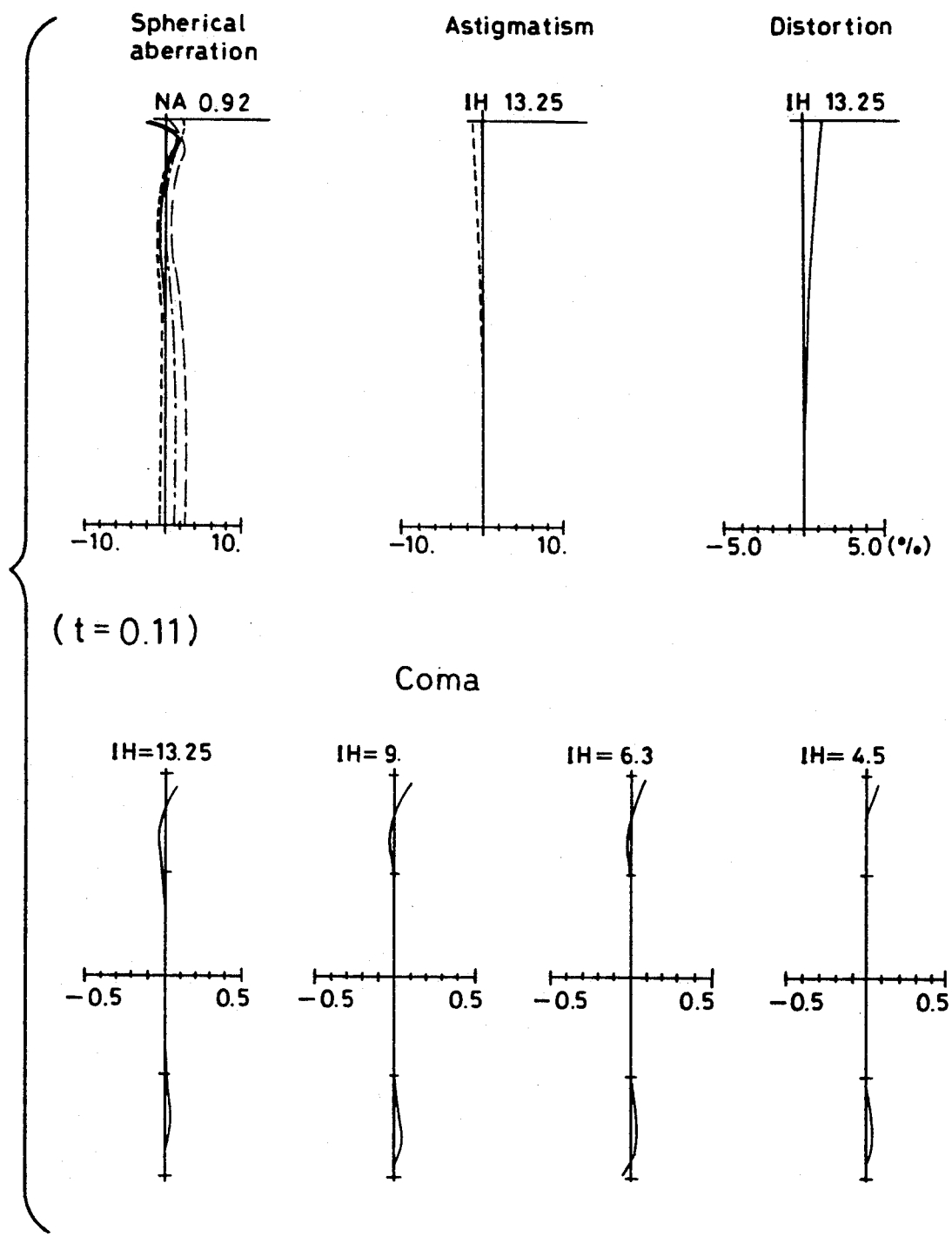
FIG. 8 represents aberration diagrams similar to those of FIG. 4, when t=0.11 in Ex. 2.
Figure 9:
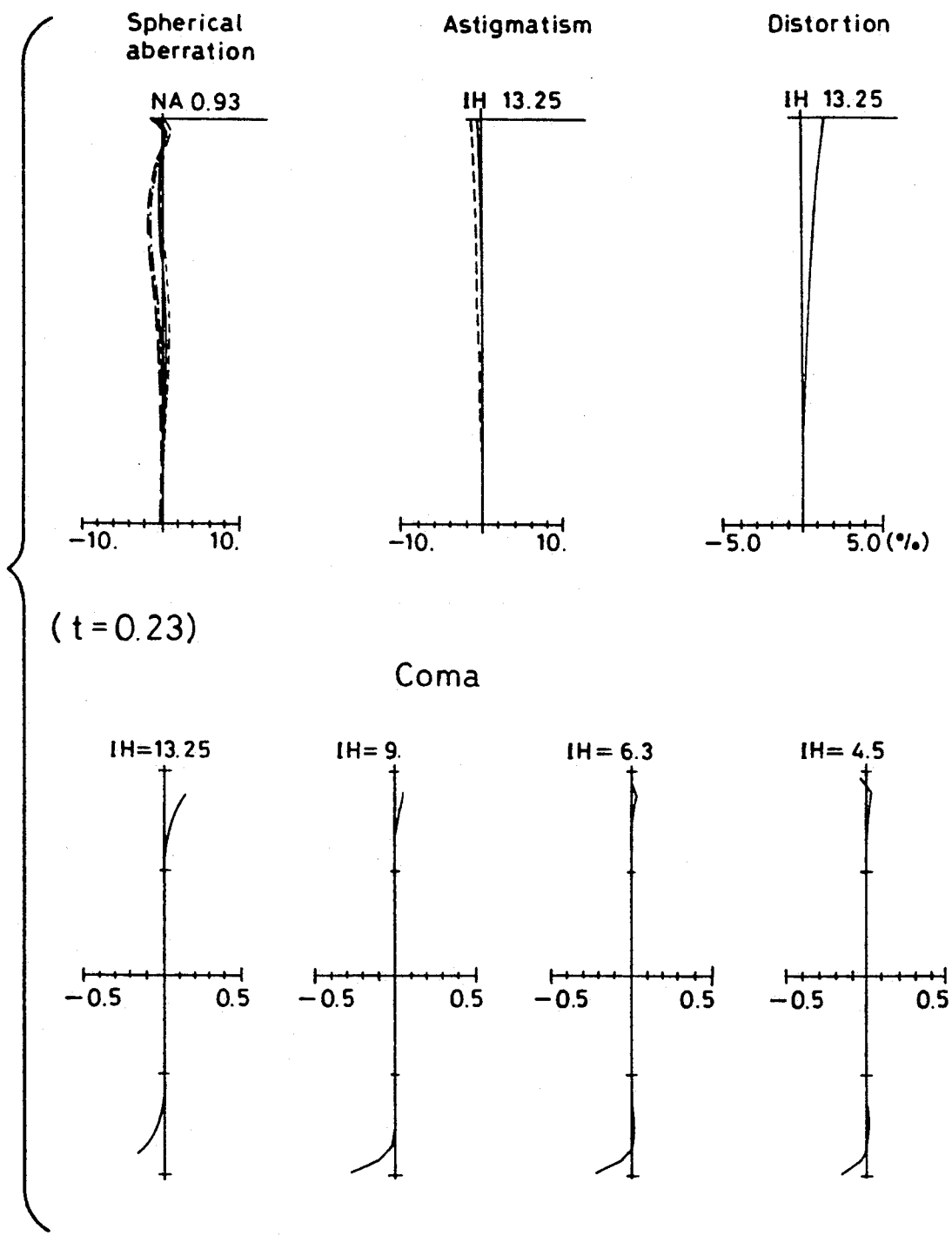
FIG. 9 represents aberration diagrams similar to those of FIG. 4, when t=0.23 in Ex. 2.
Figure 10:
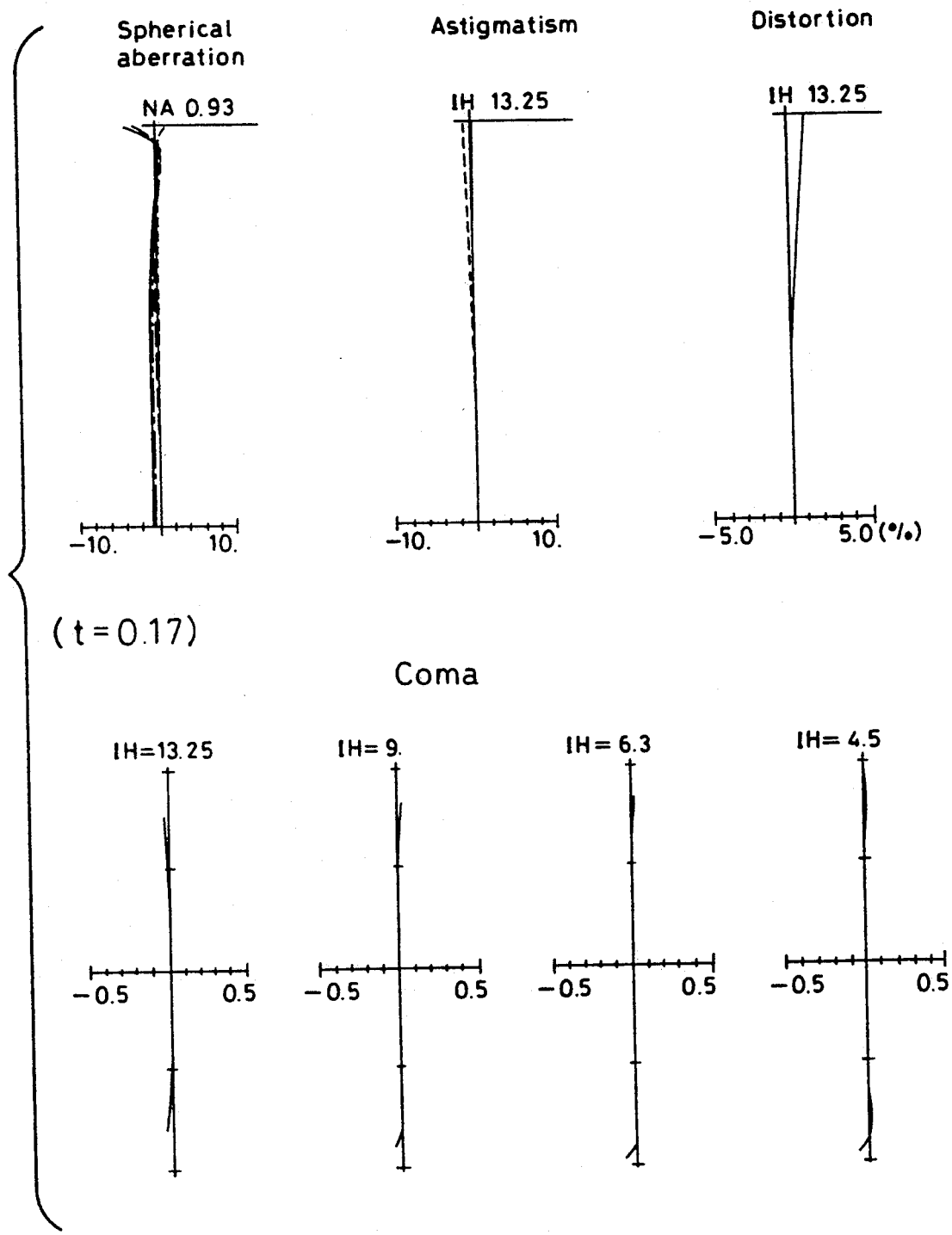
FIG. 10 represents aberration diagrams similar to those of FIG. 4, when t=0.17 in Ex. 3.
Figure 11:
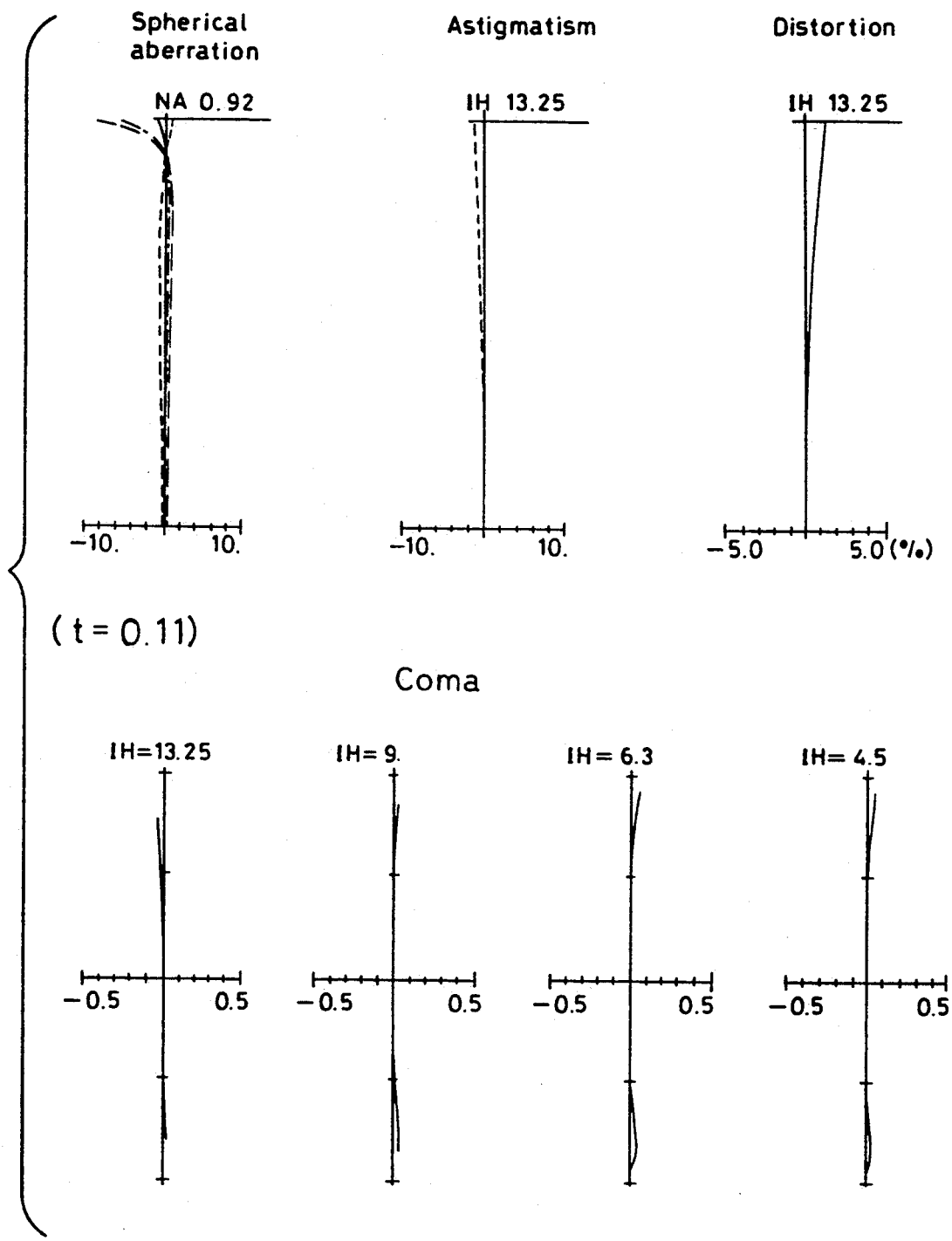
FIG. 11 represents aberration diagrams similar to those of FIG. 4, when t=0.11 in Ex. 3.
Figure 12:
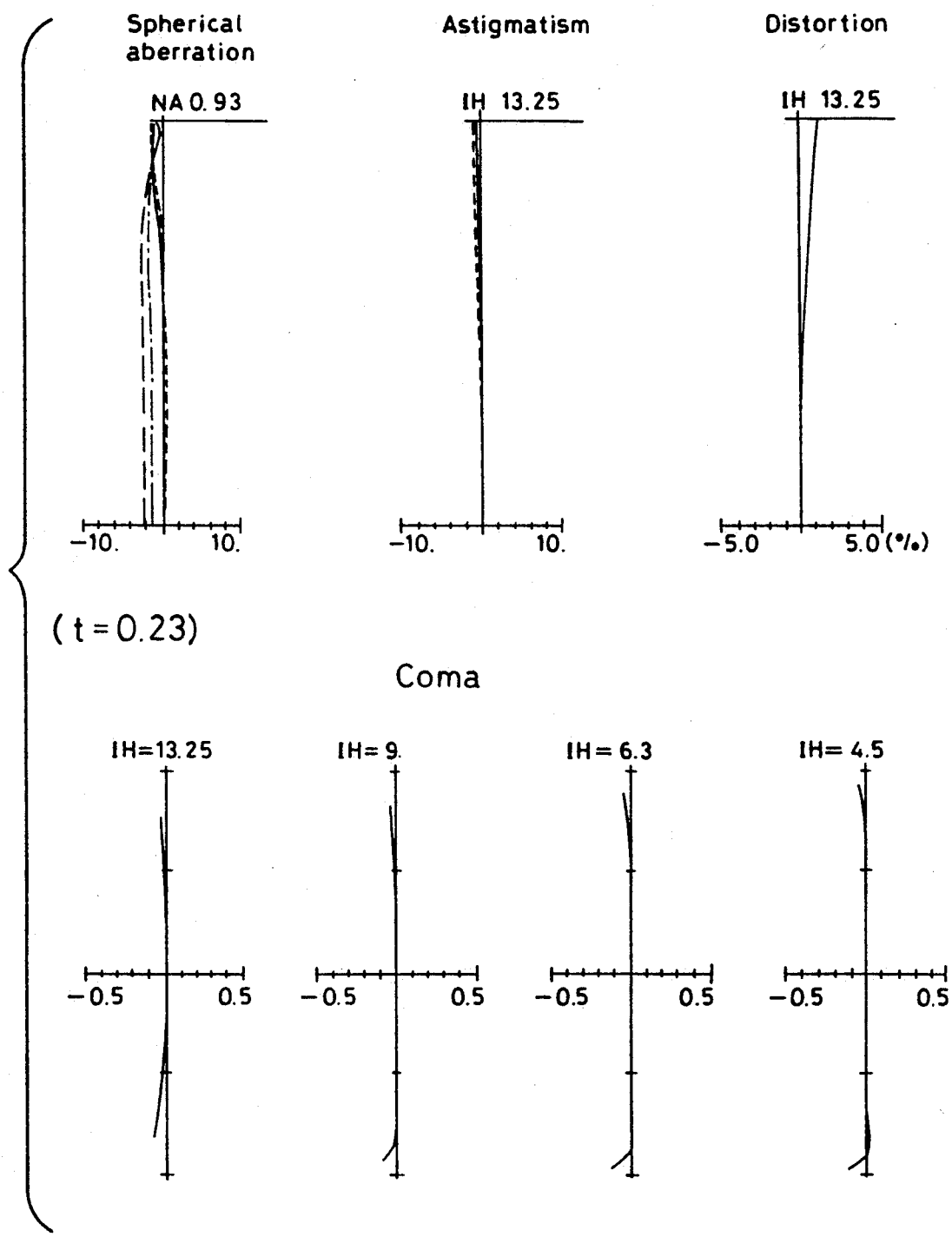
FIG. 12 represents aberration diagrams similar to those of FIG. 4, when t=0.23 in Ex. 3.

In the present invention, the spacing between the objective of Example 1, 2 or 3 and the image-forming lens may lie somewhere between 50 mm and 170 mm. The aberration diagrams showing spherical aberrations, astigmatisms, distortions and comae in the case of the spacing of 105 mm and three cover glass thicknesses are shown in FIGS. 4–6 for Example 1, in FIGS. 7–9 for Example 2 and in FIGS. 10-12 for Example 3. It is noted that virtually similar aberrational states ar obtained at any desired locations between 50 mm and 170 mm other than 105 mm.

As has been explained above, the objective for microscopes of the invention is a so-called plain apochromat type of objective that is of about 40 magnifications and has an NA as large as 0.93 with well-corrected aberrations (such as spherical aberration, chromatic aberration and coma) over an ultra-wide field range, and is most unlikely to degrade in performance due to a thickness variation of the cover glass.

What is claimed is:

1. An objective, for a microscope, that has a NA of at least 0.8, which comprises, in order from the object side:

a first lens group that includes a positive meniscus lens concave on the object side and has a positive refracting power as a whole, a second lens group disposed adjacent said first lens group with an air separation therebetween, a third lens group having a positive refracting power and which converts light from an object and passing through said first and second lens groups to a converging light, and a fourth lens group disposed adjacent said third lens group with an air separation therebetween, said fourth lens group including at least a front lens element concave on the image side and a rear lens element concave on the object side having an air separation therebetween, and wherein, plane sheet such as a cover glass is interposed between the object and said first lens said second lens group is movable along the optical axis so as to correct aberrational variations caused by a thickness change of a plane, parallel sheet interposed between the object and said first lens group.

2. An objective for microscopes as claimed in claim 1, wherein said second lens group conforms to the following condition (1):

$$|f_2/F| > 50 \tag{1}$$

where F is the composite focal length of the total system and $f_2$ is the focal length of said second lens group.

3. An objective for microscopes as claimed in claim 1 or 2, wherein the height of an axial marginal ray passing through said third lens group is higher than those of axial marginal rays through other lens groups.

4. An objective for microscopes as claimed in claim 1, wherein said second lens group consists of a cemented lens.

5. An objective for microscopes as claimed in claim 1, wherein said second lens group consists of a cemented lens of a positive lens with a negative lens.

6. An objective for microscopes as claimed in claim 1, wherein said front lens element of said fourth lens group consists of a cemented lens in a meniscus form which is convex on the object side, and said rear lens element of said fourth lens group consists of a negative meniscus lens which is concave on the object side and a a positive meniscus lens which is concave on the object side.

7. An objective for microscopes as claimed in claim 6, wherein said fourth lens group conforms to the following condition (2):

$$r_{45}/r_{46} > 1.5 \tag{2}$$

wherein $r_{45}$ and $r_{46}$ are the radii of curvature of the image side surface of said negative meniscus lens which is concave on the object side and said positive meniscus lens which is concave on the object side, respectively.

8. An objective for microscopes, which comprises, in order from the object side;
- a first lens group including a positive meniscus lens component concave on the object side and having a positive refracting power as a whole,
- a second lens group having a small refracting power,
- a third lens group having a positive refracting power and converging light leaving the object and passing through said first and second lens groups in a direction of an optical axis, and
- a fourth lens group that includes two opposite concave surfaces with air between them, and wherein said second lens group is movable on the optical axis so as to correct aberrational variations occurring due to a thickness change caused by interposition of a plane, parallel sheet, and wherein said second lens group satisfies the condition (1):

$$|f_2/F| > 50 \tag{1}$$

wherein F is the composite focal length of the total system and $f_2$ is the focal length of said second lens group.

* * * * *

UNITED STATES PATENT AND TRADEMARK OFFICE
CERTIFICATE OF CORRECTION

PATENT NO. : 5,270,860
DATED : December 14, 1993
INVENTOR(S) : SUZUKI

It is certified that error appears in the above-indentified patent and that said Letters Patent is hereby corrected as shown below:

Column 8, Line 39, delete ", plane sheet such as a cover glass is inter-"; and

Line 40, delete "posed between the object and said first lens".

Signed and Sealed this

Fifth Day of July, 1994

Attest:

BRUCE LEHMAN

*Attesting Officer*     *Commissioner of Patents and Trademarks*